United States Patent [19]
Kobler

[11] Patent Number: 5,727,296
[45] Date of Patent: Mar. 17, 1998

[54] MACHINE TOOL HAVING SWIVELABLE ROTARY HEAD

[75] Inventor: Paul Kobler, Goldach, Switzerland

[73] Assignee: Starrfrasmaschinen AG, Rorschacherberg, Switzerland

[21] Appl. No.: 802,594

[22] Filed: Feb. 19, 1997

Related U.S. Application Data

[63] Continuation of Ser. No. 355,693, Dec. 14, 1994, abandoned.

[30] Foreign Application Priority Data

Dec. 15, 1993 [EP] European Pat. Off. ............ 93120198

[51] Int. Cl.[6] ............................... B23P 23/00; B23C 3/04
[52] U.S. Cl. ..................................... 29/27 C; 409/165
[58] Field of Search ..................... 29/27 C, 27 R, 29/27 A; 409/201, 211, 165, 233, 200, 191, 204; 82/159

[56] References Cited

U.S. PATENT DOCUMENTS

| | | | |
|---|---|---|---|
| Re. 31,288 | 6/1983 | Matsuzaki et al. | 29/27 C |
| 3,359,861 | 12/1967 | Johnson et al. | 409/211 |
| 3,823,645 | 7/1974 | Suichov et al. | 409/201 |
| 4,378,621 | 4/1983 | Babel | 409/211 |
| 4,400,859 | 8/1983 | Woythal et al. | 29/27 C |
| 4,417,379 | 11/1983 | Goode | 409/200 |
| 4,478,540 | 10/1984 | Sachot | 409/211 |
| 4,610,584 | 9/1986 | Malzkornohl | 409/211 |
| 4,712,282 | 12/1987 | Romeu | 409/168 X |
| 4,769,885 | 9/1988 | Nakano | 29/40 |
| 4,787,785 | 11/1988 | Hiller et al. | 409/233 X |
| 5,014,542 | 5/1991 | Corsi | 409/201 |
| 5,222,283 | 6/1993 | Laschet | 29/27 C |
| 5,351,376 | 10/1994 | Kitamura | 29/27 C |

FOREIGN PATENT DOCUMENTS

| | | | |
|---|---|---|---|
| 456689 | 5/1975 | U.S.S.R. | 409/204 |
| 1400294 | 7/1975 | United Kingdom | 409/211 |

*Primary Examiner*—William R. Briggs
*Attorney, Agent, or Firm*—Cushman, Darby & Cushman IP Group of Pillsbury, Madison & Sutro LLP

[57] ABSTRACT

A tool carrier of a five-axis machine tool can be swivelled about a swivel axis which intersects a machining axis, about which a milling head is rotatable, in the region of the latter, at an acute angle which is preferably between 30° and 60°, most preferably 45°. As a result, during swivelling movements, only slight compensating movements, distributed over all the axes, are necessary, and yet the tool carrier can be kept short, so that deformations of the same remain small, which ensures high stability and great accuracy. In addition, large swivel angles of 90° or more on both sides are possible without collision problems, which permits a great degree of adaptation of the position of the cutting edge to the workpiece surface and high surface quality as a result. The machine tool is especially suitable for milling turbine and engine blades as well as compressor impellers.

10 Claims, 3 Drawing Sheets

MACHINE TOOL HAVING SWIVELABLE ROTARY HEAD

This is a continuation of application Ser. No. 08/355,693, filed on Dec. 14, 1994, now abandoned.

BACKGROUND OF THE INVENTION

The invention relates to a machine tool as well as to uses of the same. A machine tool of this type is known from the brochure "BostonMatic 5-AXIS PRECISION CONTOURING SYSTEM" of the BOSTON DIGITAL Corporation. In machine tools of this type, the swivel axis about which the tool carrier can be swivelled intersects the machining axis in the machining area, which has the advantage that, during swivelling of the cutting tool for better adaptation to the orientation of the workpiece surface, only slight compensating movements usually distributed over all axes are necessary.

However, the swivel axis in the machine shown in the the brochure is normal to the machining axis, which entails various disadvantages. Thus the tool carrier is constructed in a U-shape and therefore in a fairly complicated manner and is in particular long, so that the reaction forces acting on the cutting tool deform the tool carrier to a relatively high degree. For this reason, the construction is not very robust, which, if the demands imposed on the precision of the machining are very high, leads to difficulties or at least to a very heavy embodiment.

In addition, swivelling of the tool carrier is only possible in a plane in which, of necessity, the work-holding fixture with the workpiece is also arranged in a constrained manner. This restricts the swivelling range, since collision occurs even at swivel angles which are plainly less than 90°.

SUMMARY OF THE INVENTION

The invention is intended to provide a remedy here. The invention, creates a machine tool in which the swivel axis about which the tool carrier can be swivelled intersects the machining axis in the machining area, the construction of which is simple and robust and therefore permits high accuracy with little outlay. In addition, it permits large swivel angles, which permits a very great degree of adaptation of the tool position to the orientation of the workpiece surface, so that high surface quality can be achieved in a simple manner.

Machine tools according to the invention are especially suitable for milling turbine and power-plant blades as well as compressor impellers, where high surface quality must be achieved in a relatively complicated shape.

BRIEF DESCRIPTION OF THE DRAWING

The invention is described in more detail below with reference to figures merely representing exemplary embodiments, in which.

DETAILED DESCRIPTION

The machine tool according to the invention is largely shown schematically in the figures, since the invention relates to the construction in principle, and putting the same into practice presents no difficulties to the person skilled in the art.

Figure 1:
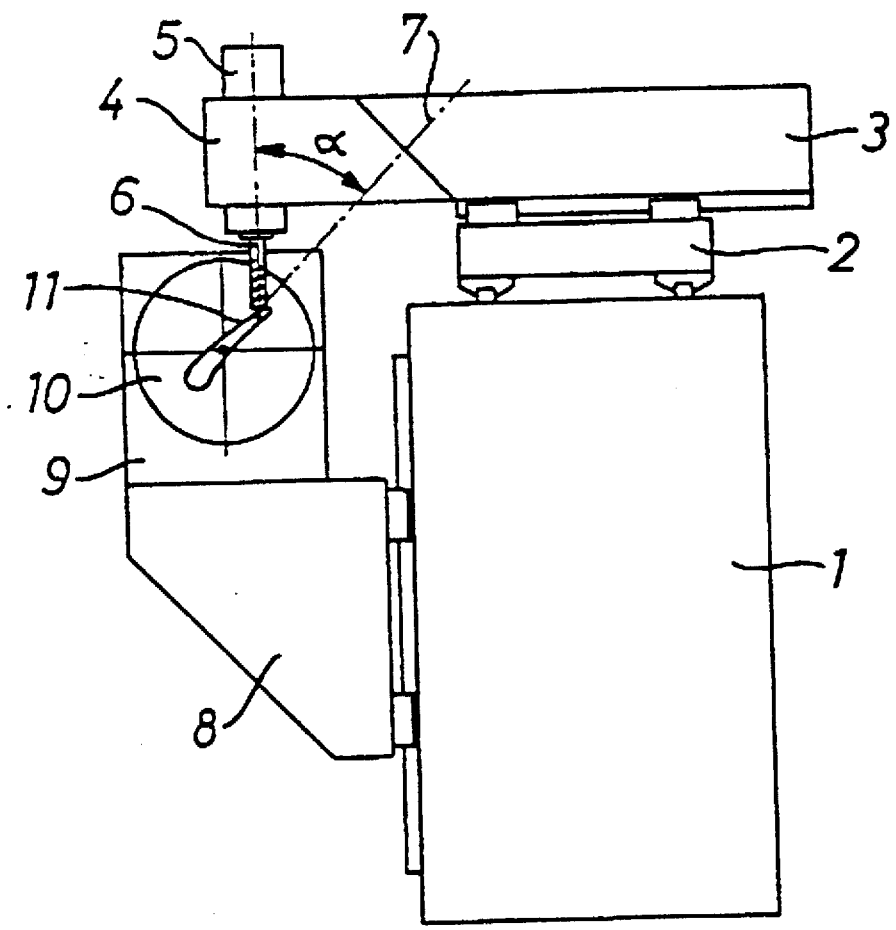
FIG. 1 shows a side view of a machine tool according to the invention in a first embodiment in the basic position.
Figure 2:
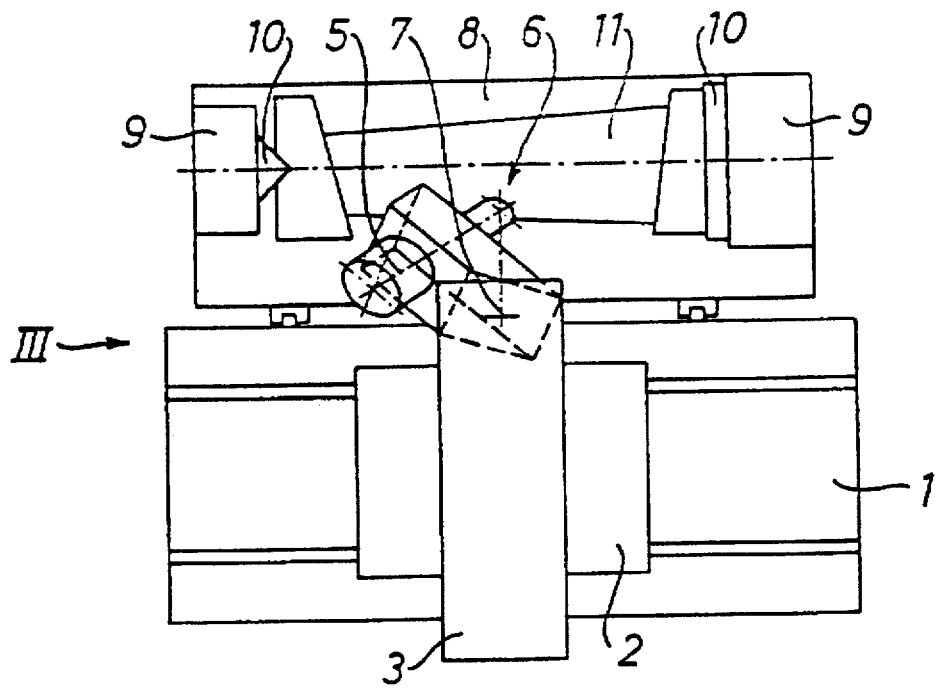
FIG. 2 shows a plan view of the machine tool according to FIG. 1 with swung-out tool carrier.
Figure 3:
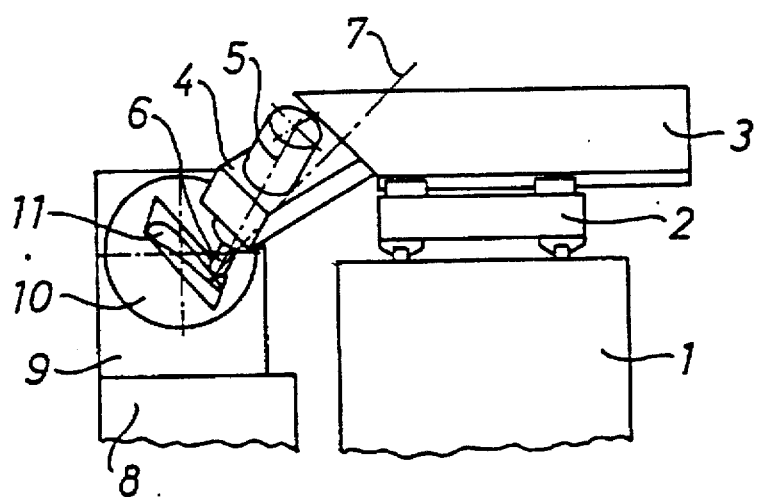
FIG. 3 shows a side view of the machine tool in the direction of the arrow designated by III in FIG. 2, FIG. 4 schematically shows the clearance of motion of the machining axis.

On the top side of a parallelepiped-shaped column 1, a first slide 2 is displaceably mounted along a horizontal first translatory axis directed normal to the diagram plane of FIG. 1, which first slide 2 carries a second slide 3 which is displaceable along a likewise horizontal, second translatory axis normal to the first translatory axis. The second slide 3 carries a tool carrier 4 having a cutting tool mounted in a fixed position in the tool carrier 4 but in such a way as to be rotatable about a machining axis 5 and designed as a milling head 6. The tool carrier 4 is fastened in a swivelling manner about a swivel axis 7 to the second slide 3. On the front side of the column 1, a further slide 8 is mounted along a vertical translatory axis so as to be displaceable towards the tool carrier 4 and away from it. It carries a rotary station 9 (parts thereof are omitted in FIGS. 1, 3) having a work-holding fixture 10 which is rotatably mounted in the rotary station 9. The axis of rotation is parallel to the first translatory axis.

A turbine blade, as workpiece 11, is clamped rotatably about its longitudinal axis in the work-holding fixture 10. The swivel axis 7 passes through the tip of the milling head 6 and at this location intersects the machining axis 5 at an angle $\alpha$ of inclination of 45°. All five axes are driven. The movements are performed in a program-controlled manner.

Figure 5:
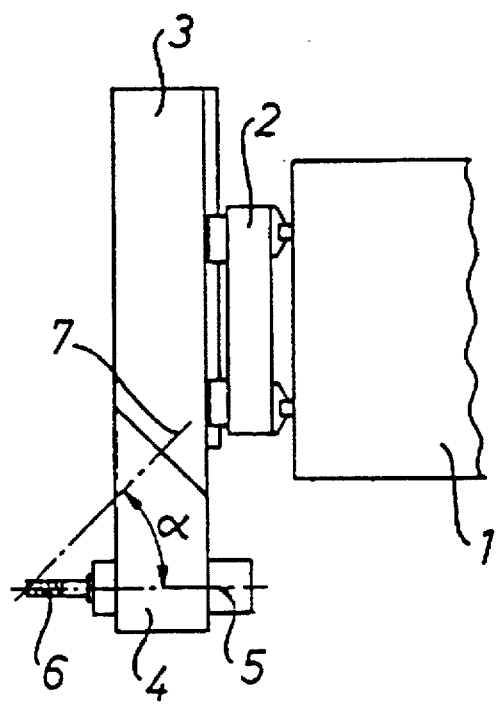
FIG. 5 shows a side view of a machine tool according to the invention in a second embodiment in the basic position.

What is of most importance, of course, are the possibilities of relative movement between the milling head 6 and the workpiece 11. The construction of the machine tool can be quite different in detail from that described above. Thus in FIG. 5 an embodiment is shown in which the second slide 3, on the bottom end of which the tool carrier 4 is suspended, can be displaced along a vertical translatory axis, whereas the first slide 2 is fastened in a horizontally displaceable manner to the front side of the column 1. The rotary station (not shown) is fastened to a slide displaceable along a horizontal translatory axis towards the column 1 and away from it.

The consequence of the swivel axis 7 enclosing an acute angle with the machining axis 5 is that the cutting edge of the milling head 6 is at a relatively small distance from the swivel bearing, and the tool carrier can be of straight and correspondingly short construction. The suspension of the milling head 6 is thereby exceptionally robust and deformations of the tool carrier 4 which impair the machining accuracy are reduced to a minimum.

Figure 4:
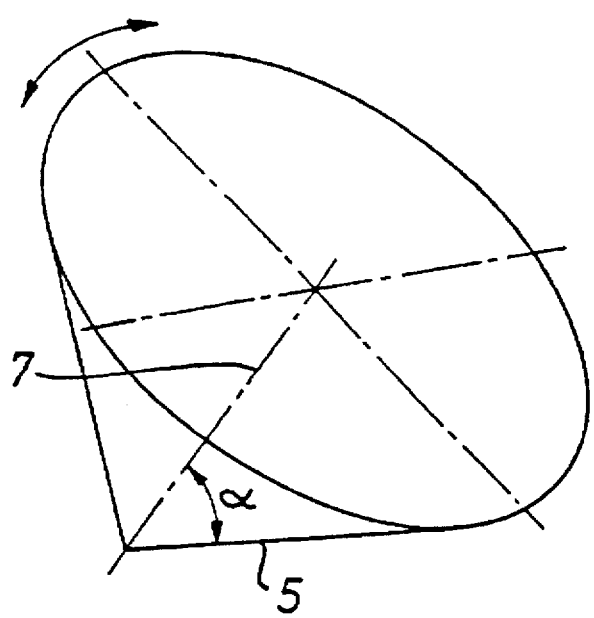

In addition, a large swivelling range of 90° or more to both sides is possible—and during swivelling the tip of the milling head 6 is not displaced or is only displaced slightly so that high working speeds can be achieved—since the tool carrier 4 is swivelled not only downwards but at the same time out of the vertical plane in which the work-holding fixture 10 with the workpiece 11 lies towards the column 1, so that the risk of collisions is substantially reduced. During such swivelling, the machining axis 5 describes a sector of an envelope of a cone, the axis of which is the swivel axis 7 (FIG. 4).

The advantages according to the invention prove to be especially valuable in the machining of turbine or engine blades, during which a high surface quality must be achieved, which requires accurate adaptation of the position of the cutting edge of the milling head 6 to the orientation of the surface of the workpiece 11. This necessitates swivelling of the tool carrier 4 over a wide range when the milling head 6 is guided over the curved surface of the workpiece 11, which swivelling otherwise easily leads to collision problems.

The machining is carried out in such a way that the work-holding fixture 10 with the workpiece 11 is rotated by the rotary station 9 and the position of the milling head 6 is constantly adapted by swivelling about the swivel axis 7 and displacements along the translatory axes. Once milling of a path has been finished, the slide 2 is displaced parallel to the longitudinal axis of the workpiece 11 by a path width and then the work-holding fixture 10 is rotated in the opposite direction. The machining is therefore effected according to circumferential paths following one another in the longitudinal direction. The changes in the direction of rotation preferably take place at an edge of the workpiece 11.

Considerable advantages, in particular good surface quality, are also obtained from the large swivel range when machining compressor impellers.

To achieve the effect according to the invention, it is not necessary for the angle α of inclination to be exactly 45°. Even an acute angle deviating only slightly from the right angle, given a suitable construction, can produce the advantages described. However, an angle α of inclination lying between 30° and 60° is preferred.

It is also unnecessary for the swivel axis 7 to intersect the machining axis 5 and pass exactly through the tip of the milling head 6. Even if the swivel axis 7 passes close to the milling head 6, generally only small compensating movements are necessary during swivelling.

I claim:

1. A machine tool, comprising:
   a rotary station constructed and arranged to drivingly rotate a workpiece about a longitudinal axis;
   a work-holding fixture for clamping each of two ends of said workpiece within said rotary station, said work-holding fixture being driven to rotate while clamping said two ends to enable said workpiece to rotate about said longitudinal axis;
   a tool carrier mounted adjacent said rotary station and carrying a milling head which carries a cutting tool rotatable about a machining axis, said tool carrier being swivelable about a swivel axis which encloses a positive, acute angle of inclination relative to said machining axis and intersects substantially said machining axis of said cutting tool.

2. The machine tool of claim 1, wherein:
   said angle of inclination is between 30° and 60° relative to said machining axis.

3. The machine tool of claim 2, wherein:
   said angle of inclination is at least 45° relative to said machining axis.

4. The machine tool of claim 1, wherein:
   at least one of the tool carrier and the work-holding fixture is supported for movement relatively towards and away from one another.

5. The machine tool of claim 4, wherein:
   said movement includes movement along three differently oriented translatory axes.

6. The machine tool of claim 5, wherein:
   said translatory axes are mutually orthogonal.

7. The machine tool of claim 5, further including:
   a support column;
   a first slide supported on said column for translatory movement along a first one of said translatory axes;
   a second slide supported on said first slide for translatory movement along a second one of said translatory axes; and
   said tool carrier being connected to said second slide for rotation about said swivel axis relative to said second slide;
   one of said first and second translatory axes being parallel to said axis of rotation of said work-holding fixture.

8. The machine tool of claim 5, wherein:
   a first one of said translatory axes is parallel to said axis of rotation of said work-holding fixture.

9. The machine tool of claim 1, wherein:
   said rotary station is constructed and arranged such that said longitudinal axis about which said workpiece is rotated is horizontally disposed.

10. The machine tool of claim 1, wherein:
    said tool carrier is swivelable about said swivel axis during operation of said machine tool.

* * * * *